3,470,745
PRESSURE TO CURRENT TRANSDUCING MANOMETER

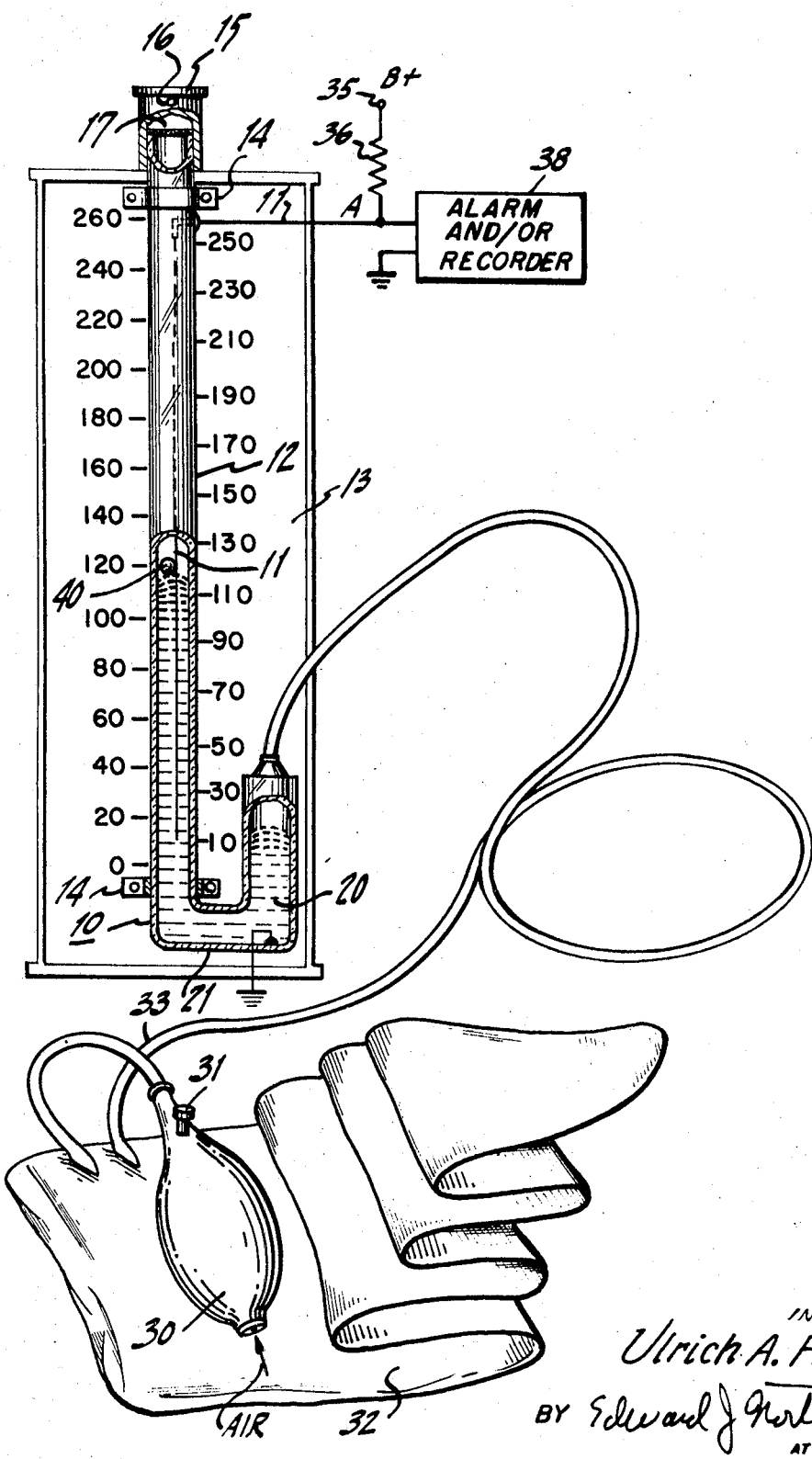

Ulrich A. Frank, Yardley, Pa., assignor, by mesne assignments, to Hoffmann-La Roche Inc., Nutley, N.J., a corporation of New Jersey
Filed Dec. 26, 1967, Ser. No. 693,609
Int. Cl. G01l 9/00, 7/18
U.S. Cl. 73—398      5 Claims

ABSTRACT OF THE DISCLOSURE

A mercury manometer, one leg of which has a resistance wire suspended longitudinally therein so that as the mercury rises it shorts out progressively greater portions of the resistance. A small nylon ball floats on the mercury and agitates the surface to break up any scum which may form there and also cleans the wire as the mercury rises and falls.

BACKGROUND OF THE INVENTION

This invention relates to a manometer and, more particularly, to a manometer which acts as a pressure to current transducer.

An automatic apparatus capable of measuring blood pressure (sphygmomanometer) in a simple and convenient manner finds particular importance in certain fields of medicine. Particular use at the present time for such automatic apparatus is in hospital operating rooms, hospital intensive care wards, and in many experimental fields of medicine. Such automatic apparatus should be one that can set off an alarm when the blood pressure is above or below certain limits and, at the same time, give a visual indication and perhaps even a recording of the blood pressure.

Various pressure to current transducers using a manometer tube are known in the prior art. Although originally many of these transducers work quite well, sooner or later it has been found that certain irregularities between the change in pressure and the change in current occur due to the formation of undesirable materials within the manometer tube. This causes occasionally false alarms and inaccurate recordings. Due to the fact that human life may depend upon the proper operation of this apparatus, any such defects cannot be tolerated. Therefore, transducers of this type have not found practical use.

It is an object of this invention to provide an improved manometer which acts as a pressure to current transducer as well as a visual indicator.

It is a further object of this invention to provide a manometer wherein a freely moving member agitates the meniscus of a column of measuring fluid in the manometer tube to break up the foreign materials collected on the surface of the column of mercury in the tube and also cleans both the tube itself and the transducing wire within the tube.

BRIEF DESCRIPTION OF THE INVENTION

Briefly, these and other objectives are accomplished in an improved manometer of the type especially suitable for use as a sphygmomanometer. An elongated, vertically oriented tube of poor electrically conductive material has the bottom end coupled to a sealed reservoir of electrically conductive measuring fluid such as mercury. The top end of the tube is open to the atmosphere to provide a barometric correction to the manometer tube reading. An electrical means is coupled to the measuring fluid within the tube for deriving an electrical signal having a magnitude which is a function of the level of said measuring fluid in said tube. As air pressure applied into the sealed reservoir changes, the vertical level of the mercury within the tube changes causing a corresponding change in the electrical signal. A freely moving member floats on the meniscus of the column of the measuring fluid in the manometer tube and disrupts the formation of undesirable materials or impurities within the tube. These impurities when collected on the surface produce irregularities between the changes in current in the transducing manometer system.

DESCRIPTION OF THE PREFERRED EMBODIMENT

A more complete understanding of the invention and the various objectives, and advantages thereof may be obtained from a consideration of the following detailed descritpion taken together with the attached single illustration showing a sketch of a manometer in accordance with one embodiment of the present invention.

In accordance with a preferred embodiment of this invention, a highly resistive wire 11 extends within and along the length of a portion of the elongated glass tube 12 of a manometer 10 as shown in the single illustration. The highly resistive wire 11 may be made of tungsten, platinum-iridium or such materials which do not react with mercury and are least affected by the atmosphere. The elongated tube 12 is attached to a mounting plate 13 having visual pressure markers thereon. Clamps 14 hold the glass tube 12 to the mounting plate 13. The glass tube 12 is vertically oriented with a cap 15 over the top open end of the vertical glass 12. The cap 15 has an aperture 16 therethrough. At the top of the tube is located a porous leather disk 17. Both the aperture and the disk allow the flow of air to pass into the measuring tube but filter the air and prevent the spillage of mercury out of the tube. The bototm end of the tube 12 is mounted to a sealed reservoir 21 containing mercury 20.

When the manometer 10 is operated as part of a sphygmomanometer for example, an air pump or bellows 30 as shown in the illustration provides air pressure through a valve 31 into the top of reservoir 21 through inflatable cuff 32 and tubing 33. In an automatic system the air pump 30 may be of any one of the known electrically controlled air pumps. The inflatable cuff when measuring blood pressure may be placed around the upper arm about the brachial artery. As the air pressure from the air pump 30 increases the cuff 32 expands and the column of the mercury in the tube 12 rises.

A voltage source (not shown) is applied at terminal 35 and coupled through resistor 36 to the top portion of highly resistive wire 11. The resistor 36 may be a sectional length of the highly resistive wire 11. As shown in the illustration, the reservoir of mercury 21 may be coupled to ground or a reference potential. An alarm and/or recorder 38 is coupled between the top portion of the resistive wire 11 and ground or reference potential.

As the air pressure is applied from bellows 30 to the cuff 32 and to the reservoir 21, the column of mercury rises. As the level of mercury rises in the tube, the larger diameter column of mercury being a better electrical conductor than the highly resistive wire, shunts the highly resistive wire 11 causing an increase in current between the top portion of the wire 11 and ground or reference potential and therefore the potential difference across the input of the alarm and/or recorder 38 decreases. When a decrease in air pressure occurs, for example, by opening a pressure regulating valve 31 so as to slowly deflate the cuff 32 and remove the air pressure in the reservoir, the level of the column of mercury in the tube 12 lowers and causes less shunting of the resistive wire 11. The reduction in shunting of the resistive wire 11 causes a corresponding decrease in current conduction between the top portion of the resistive wire 11 and ground or reference potential and therefore the voltage across the input of the alarm and/or recorder increases. If the pressure regulating valve 31 leaks off air pressure linearly, there should be a linear change in current through the resistive wire 11. This change may be recorded or may provide, if the blood pressure is above or below a certain level, an alarm. In this manner an apparatus is provided which serves to provide a record and/or alarm indication of the blood pressure levels as well as serve to provide a visual blood pressure indication.

When such a manometer as described above is operated over an extended period of time, two sources of nonlinearity between the pressure level and the current indication occur. The first is caused during decreasing of air pressure by the mercury meniscus occasionally hanging up on the surface of the tube and then suddenly dropping to produce nonlinear inputs to the alarms and/or recorders. This hanging up is believed due to formation of impurities on the inside of the tube. A second source of nonlinearity which also occurs during a linear reduction of air pressure is the formation of undesirable materials, such as mercuric oxide HgO and/or dirt on the highly resistive conducting wire 11. This formation acts to insulate the wire 11 from contact with the mercury causing inaccurate and sometimes no reading at all. These nonlinearities in both cases provide these inaccuracies during the decrease in pressure which is the critical measuring period when the manometer is operated as a blood pressure indicator. Due to the nature of the use of such a system, these nonlinearities are not only undesirable but render the entire system useless.

By placing a small ball of nylon 40 (for example 1/8 inch in diameter in a 3/8 inch diameter tube), it was found that as the ball rotates and glides across the meniscus of the column of mercury due to the dropping and using of the mercury level, the ball agitates the surface breaking up the foreign materials collected on the surface of the mercury, preventing the foreign material from insulating the resistive wire from the mercury. Also the motion induced in the ball by the dropping or rising of the mercury level, the ball serves to prevent the meniscus of the column of mercury from occasionally hanging up on the surface of the tube and also brushes up against the resistive wire and tube acting to clean the resistive wire and tube.

It has been found that when operating several manometers as described above over an extended period of time with some containing the floating ball and others not containing the floating ball, the manometers without the floating ball caused nonlinearities in the system and those having the floating ball continued to operate in a linear manner.

What is claimed is:

1. In a manometer of the type having an elongated vertically oriented poor electrically conductive tube with the top end of the tube opened to atmosphere and the bottom end of the tube coupled to a sealed reservoir of electrically conductive measuring fluid, whereby upon air pressure being applied or removed from said reservoir there is caused a corresponding change in the vertical level of said measuring fluid in said tube, the improvement comprising:

electrical means coupled to said measuring fluid within said tube for deriving an electrical signal having a magnitude which is a function of the level of said measuring fluid in said tube, wherein said manometer is subject to the formation of undesirable materials within said tube which cause irregularities in the magnitude of said electrical signal as a function of the level of said measuring fluid, and means floating on the surface of said measuring fluid within said tube for disrupting the formation of said undesirable materials to maintain the magnitude of said electrical signal as a fixed predetermined function of the level of said measuring fluid.

2. The combination as claimed in claim 1, wherein said electrical means includes at least one conductive member within said tube, and said means for disrupting the formation of said undesirable materials includes a freely moving body floating on the surface of said measuring fluid within said tube which agitates the surface of said measuring fluid in said tube and brushes up against said conductive member.

3. In a manometer of the type having an elongated vertically oriented poor electrically conductive tube with the top end of the tube opened to atmosphere and the bottom end of the tube coupled to a sealed reservoir of electrically conductive measuring fluid, whereby upon air pressure being applied or removed from said reservoir there is caused a corresponding change in the vertical level of said measuring fluid in said tube, the improvement comprising:

a highly resistive conductive member positioned within and along a portion of the length of said tube, a source of potential coupled across said conductive member, whereby the current through said conductive member varies linearly with the changes in the level of said measuring fluid in contact with said conductive member, and means responsive to said changes in the level of said measuring fluid for agitating the surface of the measuring fluid within the tube and for cleansing said resistive wire to maintain linearity between the change in pressure applied to said tube and the change in current through said conductive member.

4. The manometer as claimed in claim 3, wherein said means for agitating and for cleansing is a freely moving body of a material which floats on said measuring fluid.

5. The combination as claimed in claim 4, wherein said freely moving body is a small nylon ball and wherein said measuring fluid is mercury.

References Cited

UNITED STATES PATENTS

| 2,047,902 | 7/1936 | Eitzen | 338—94 X |
| 2,439,770 | 4/1948 | Brown et al. | 73—401 X |
| 2,920,159 | 1/1960 | Snyder | 73—401 X |

S. CLEMENT SWISHER, Primary Examiner

U.S. Cl. X.R.

73—401; 338—38